United States Patent
Chien et al.

(10) Patent No.: US 10,635,601 B2
(45) Date of Patent: Apr. 28, 2020

(54) FLASH MEMORY DEVICES AND PREFETCH METHODS THEREOF

(71) Applicant: Silicon Motion, Inc., Jhubei (TW)

(72) Inventors: Jieh-Hsin Chien, Taoyuan (TW); Yi-Hua Pao, Hsinchu (TW)

(73) Assignee: Silicon Motion, Inc., Jhubei (TW)

( * ) Notice: Subject to any disclaimer, the term of this patent is extended or adjusted under 35 U.S.C. 154(b) by 0 days.

(21) Appl. No.: 15/954,307

(22) Filed: Apr. 16, 2018

(65) Prior Publication Data

US 2018/0329827 A1 Nov. 15, 2018

Related U.S. Application Data

(60) Provisional application No. 62/504,140, filed on May 10, 2017.

(30) Foreign Application Priority Data

Aug. 3, 2017 (TW) .............................. 106126215 A

(51) Int. Cl.
*G06F 12/1009* (2016.01)
*G06F 12/0868* (2016.01)
(Continued)

(52) U.S. Cl.
CPC ...... *G06F 12/1009* (2013.01); *G06F 12/0246* (2013.01); *G06F 12/0862* (2013.01); *G06F 12/0868* (2013.01); *G06F 2212/1021* (2013.01); *G06F 2212/1024* (2013.01); *G06F 2212/2022* (2013.01); *G06F 2212/463* (2013.01);
(Continued)

(58) Field of Classification Search
CPC ......... G06F 12/0246; G06F 2212/7201; G06F 12/0862; G06F 2212/2022; G06F 12/0868; G06F 3/0619; G06F 3/0653; G06F 3/0656; G06F 3/0679; G06F 12/1009; G06F 2212/1021; G06F 2212/1024; G06F 2212/657; G11C 11/40; G11C 16/20;
(Continued)

(56) References Cited

U.S. PATENT DOCUMENTS 6,738,289 B2  5/2004  Gongwer et al.
7,224,614 B1  5/2007  Chan
(Continued)

FOREIGN PATENT DOCUMENTS

JP  S6046452 B2  10/1985
JP  H03226851 A  10/1991
(Continued)

OTHER PUBLICATIONS

Office Action of corresponding TW application, dated Jul. 31, 2018.
(Continued)

*Primary Examiner* — Hashem Farrokh
(74) *Attorney, Agent, or Firm* — Wang Law Firm, Inc.

(57) ABSTRACT

A storage device includes a flash memory array and a controller. The flash memory array stores a plurality of user data. After the controller finishes initialization, the controller accesses the user data stored in the flash memory array according to a plurality of host commands and an H2F mapping table, and records a plurality of address information about the user data in a powered-ON access table.

13 Claims, 5 Drawing Sheets

(51) Int. Cl.
*G06F 12/0862* (2016.01)
*G06F 12/02* (2006.01)
(52) U.S. Cl.
CPC ............... *G06F 2212/6028* (2013.01); *G06F 2212/657* (2013.01); *G06F 2212/7201* (2013.01)
(58) Field of Classification Search
CPC ..... G11C 16/3418; G11C 29/08; G11C 29/42; G11C 29/52
USPC .......................................................... 711/204
See application file for complete search history.

(56) References Cited

U.S. PATENT DOCUMENTS

| | | | |
|---|---|---|---|
| 2004/0057318 A1 | 3/2004 | Cernea et al. | |
| 2005/0160217 A1 | 7/2005 | Gonzalez | |
| 2005/0169082 A1 | 8/2005 | Cernea | |
| 2006/0195650 A1* | 8/2006 | Su | G11C 16/20 |
| | | | 711/103 |
| 2012/0136875 A1* | 5/2012 | Pan | G06F 16/24578 |
| | | | 707/748 |
| 2013/0086309 A1* | 4/2013 | Lee | G06F 12/0246 |
| | | | 711/103 |
| 2014/0215199 A1 | 7/2014 | Ma et al. | |
| 2014/0223079 A1* | 8/2014 | Zhang | G06F 12/0246 |
| | | | 711/103 |
| 2014/0281458 A1* | 9/2014 | Ravimohan | G06F 9/4401 |
| | | | 713/2 |
| 2016/0162215 A1* | 6/2016 | Jayaraman | G06F 3/0659 |
| | | | 711/103 |
| 2017/0277471 A1 | 9/2017 | Huang et al. | |
| 2017/0277472 A1 | 9/2017 | Huang et al. | |
| 2017/0286288 A1 | 10/2017 | Higgins et al. | |
| 2018/0114570 A1 | 4/2018 | Lin | |
| 2018/0121109 A1* | 5/2018 | Li | G06F 3/0656 |

FOREIGN PATENT DOCUMENTS

| | | |
|---|---|---|
| JP | 2007179089 A | 7/2007 |
| JP | 2008192267 A | 8/2008 |
| JP | 2009087509 A | 4/2009 |
| JP | 2009205578 A | 9/2009 |
| JP | 2011128751 A | 6/2011 |

OTHER PUBLICATIONS

Office Action of co-pending U.S. Appl. No. 15/954,308, dated May 15, 2019.

* cited by examiner

| No. | logic address |
|---|---|
| #1 | 1000 |
| #2 | 1001 |
| #3 | 1002 |
| #4 | 5000 |
| #5 | 5001 |
| #6 | 5002 |
| #7 | 8888 |
| #8 | 8889 |
| #9 | 8890 |
| #10 | 8899 |

| No. | logic address | physical address |
|---|---|---|
| #1 | 1000 | 0101 |
| #2 | 1001 | 0201 |
| #3 | 1002 | 0301 |
| #4 | 5000 | 0401 |
| #5 | 5001 | 0155 |
| #6 | 5002 | 0207 |
| #7 | 8888 | 0323 |
| #8 | 8889 | 0421 |
| #9 | 8890 | 3311 |
| #10 | 8899 | 0310 |

FLASH MEMORY DEVICES AND PREFETCH METHODS THEREOF

CROSS REFERENCE TO RELATED APPLICATIONS

This application claims the benefit of U.S. Provisional Application No. 62/504,140, filed on May 10, 2017, the entirety of which is incorporated by reference herein.

This Application claims priority of Taiwan Patent Application No. 106126215, filed on Aug. 3, 2017, the entirety of which is incorporated by reference herein.

BACKGROUND OF THE INVENTION

Field of the Invention

The disclosure relates generally to a flash memory device and a prefetch method thereof.

Description of the Related Art

When a system is powered ON, the solid-state disk is usually powered ON as well. However, the period between when the solid-state disk is powered ON and when the solid-state disk is first accessed is idle time. In order to effectively improve the performance of the solid-state disk, it is necessary to utilize this idle time more effectively for improving the access speed of the solid-state disk.

BRIEF SUMMARY OF THE INVENTION

In an embodiment, a storage device comprises a flash memory array and a controller. The flash memory array stores a plurality of user data. After the controller finishes initialization, the controller accesses the user data in the flash memory array according to a plurality of host commands and an H2F mapping table and records a plurality of address information about the user data in a powered-ON access table.

According to an embodiment of the invention, the size of the powered-ON access table is less than the H2F mapping table.

According to an embodiment of the invention, the address information is a plurality of logic addresses of the user data.

According to an embodiment of the invention, the address information further comprises a plurality of physical addresses of the user data.

According to an embodiment of the invention, the controller records, according to an access order of the user data, the address information in the powered-ON access table.

In another embodiment, a storage device comprises: a flash memory array and a controller. The flash memory array stores a plurality of user data. After the controller finishes initialization, the controller determines whether a powered-ON access table exists in the flash memory array. When the powered-ON access table exists in the flash memory array, the controller prefetches the user data corresponding to the powered-ON access table to a data register.

According to an embodiment of the invention, the controller further prefetches the user data corresponding to the powered-ON access table to the data register according to an H2F mapping table.

According to an embodiment of the invention, when the user data corresponding to the powered-ON access table exceeds the capacity of the data register, the controller only prefetches a part of the user data corresponding to the powered-ON access table to the data register.

According to an embodiment of the invention, the controller sequentially prefetches the user data corresponding to the powered-ON access table to the data register.

According to an embodiment of the invention, after the controller finishes the initialization and before the controller receives a host command, the controller prefetches the user data corresponding to the powered-ON access table to the data register.

In yet another embodiment, a method for building a powered-ON access table of a storage device comprises: executing an initialization; accessing a plurality of user data stored in a flash memory array according to a plurality of host commands and an H2F mapping table; and recording address information of the user data in the powered-ON access table.

In yet another embodiment, a method for utilizing a powered-ON access table of a storage device, comprises: executing an initialization; and determining whether the powered-ON access table exists. When the powered-ON access table exists, prefetching user data corresponding to the powered-ON access table from a flash memory array to a data register.

According to an embodiment of the invention, the method further comprises: accessing the storage device according to a plurality of host commands, the powered-ON access table, and an H2F mapping table.

According to an embodiment of the invention, the method further comprises: when the powered-ON access table does not exist, accessing the storage device according to a plurality of host commands and an H2F mapping table.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 2A is a schematic diagram of a powered-ON access table in accordance with an embodiment of the invention;

FIG. 2B is a schematic diagram of a powered-ON access table in accordance with another embodiment of the invention;

DETAILED DESCRIPTION OF THE INVENTION

Figure 1:
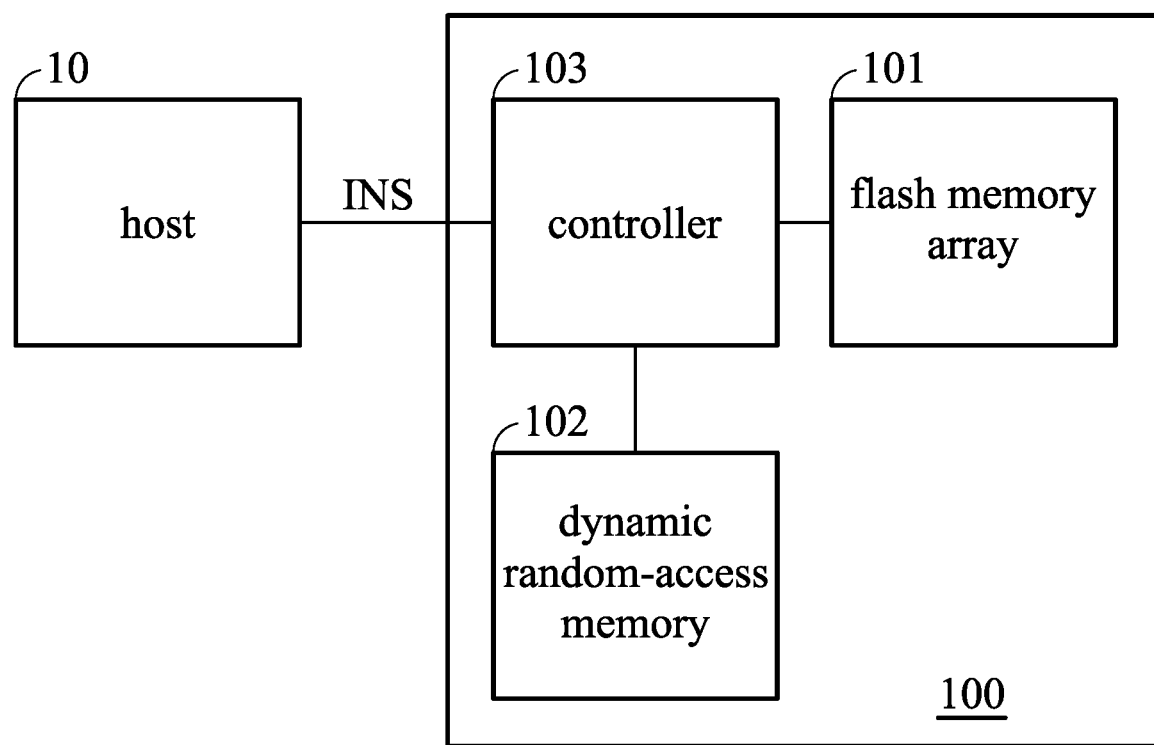
FIG. 1 is a block diagram of a storage device in accordance with an embodiment of the invention.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It should be understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

FIG. 1 is a block diagram of a storage device in accordance with an embodiment of the invention. As shown in FIG. 1, the storage device 100 includes a flash memory array 101, a dynamic random-access memory (DRAM) 102, and a controller 103, in which the storage device 100 is coupled to a host 10. The host 10 and the storage device 100 construct a system. The storage device 100 generates and maintains a Host Logical-Flash Physical (H2F) mapping table, which records the mapping relationship between the logical address of the user data and the physical address. According to an embodiment of the invention, the storage device 100 may be a solid-state disk having a physical interface of USB, SATA, PATA, or PCIE or adapting a communication protocol of USB, NVME, AHCI, or SCSI.

It is assumed that the data capacity of the storage device 100 is 256 GB, and, after the system is powered ON, the controller 103 provides the user data required by the host 10 according to H2F mapping table and records the mapping relationship of the logic addresses of the user data to physical addresses in a powered-ON access table. It is assumed that the size of a logic address or physical address is 2B such that a logic address or physical address corresponds to 4 kB user data and the controller 103 may build a 8 MB powered-ON access table to record the logic addresses for 16 GB user data. The powered-ON access table records the user data that the host 10 is going to read or write. According to the operating characteristics of the host 10, the user data recorded in the powered-ON access table may be an operation system, applications, or files of computer games. The powered-ON access table is mainly configured to record the user data that the host 10 is going to read, and is sometimes configured to record the user data that the host 10 is going to update or write.

When the host 10 begins initializing, the host 10 also requests the peripheral devices, such as the storage device 100, to initialize. However, the period for the storage device 100 to initialize is less than that for the host 10 to initialize. Therefore, in the period after the storage device 100 finishes the initialization and before the host 10 finishes the initialization (i.e., the idle time), the controller 103 prefetches, according to the address information record in the powered-ON access table, the user data from the flash memory array 101 to the DRAM 102. When the host 10 finishes the initialization and begins prefetching the operation system, that is, when the host 10 is loading up the operation system from the storage device 100, the storage device 100 can rapidly provide the files of the operation system (i.e., the user data) to the host 10 from the DRAM 102 instead of the flash memory array 101 for shortening the data-accessing time.

According to another embodiment of the invention, the record in the powered-ON access table is preferable to be recorded with the reading order of the user data. It is assumed that the controller 103 may not prefetch all the user data corresponding to the powered-ON access table to the DRAM 102 in the idle time. Since the prefetched user data may be first read by the host 10, the controller 103 may continue to load the rest of the user data corresponding to the powered-ON access table to the DRAM 102 during the process of data reading and processing for the host 10 to read such that the purpose of the invention is achieved.

According to another embodiment of the invention, the controller 103 arranges the record in the powered-ON access table according to the parameters of the flash memory array 101 for speeding up the speed of reading the user data, in which the parameters of the flash memory array 101 includes the number of channels and/or the number of chip enable pins.

According to another embodiment of the invention, the size of the user data corresponding to the powered-ON access table is preferable to be less than the capacity of the DRAM 102 such that all the user data corresponding to the powered-ON access table can be surely loaded to the DRAM 102.

According to another embodiment of the invention, when the size of the user data corresponding to the powered-ON access table exceeds the capacity of the DRAM 102, the controller 103 may only prefetch part of the user data corresponding to the powered-ON access table to the DRAM 102. After the prefetched user data is read by the host 10, the user data already stored in the DRAM 102 may be replaced with the rest of the user data corresponding to the powered-ON access table.

FIG. 2A is a schematic diagram of a powered-ON access table in accordance with an embodiment of the invention. According to an embodiment of the invention, the powered-ON access table 200A is configured to record the logic address of the user data. According to the H2F mapping table, the controller 103 may understand that each user data stores in which physical address of the flash memory array 101. 10 user data is illustrated In FIG. 2A, but not intended to be limited thereto.

FIG. 2B is a schematic diagram of a powered-ON access table in accordance with another embodiment of the invention. According to an embodiment of the invention, the powered-ON access table 200B records the logical address and the physical address of the user data as a small H2F mapping table. Therefore, the controller 103 may understand that the mapping relationship of the user data and the physical address of the flash memory array 101. 10 user data is illustrated In FIG. 2B, but not intended to be limited thereto.

Figure 3A:
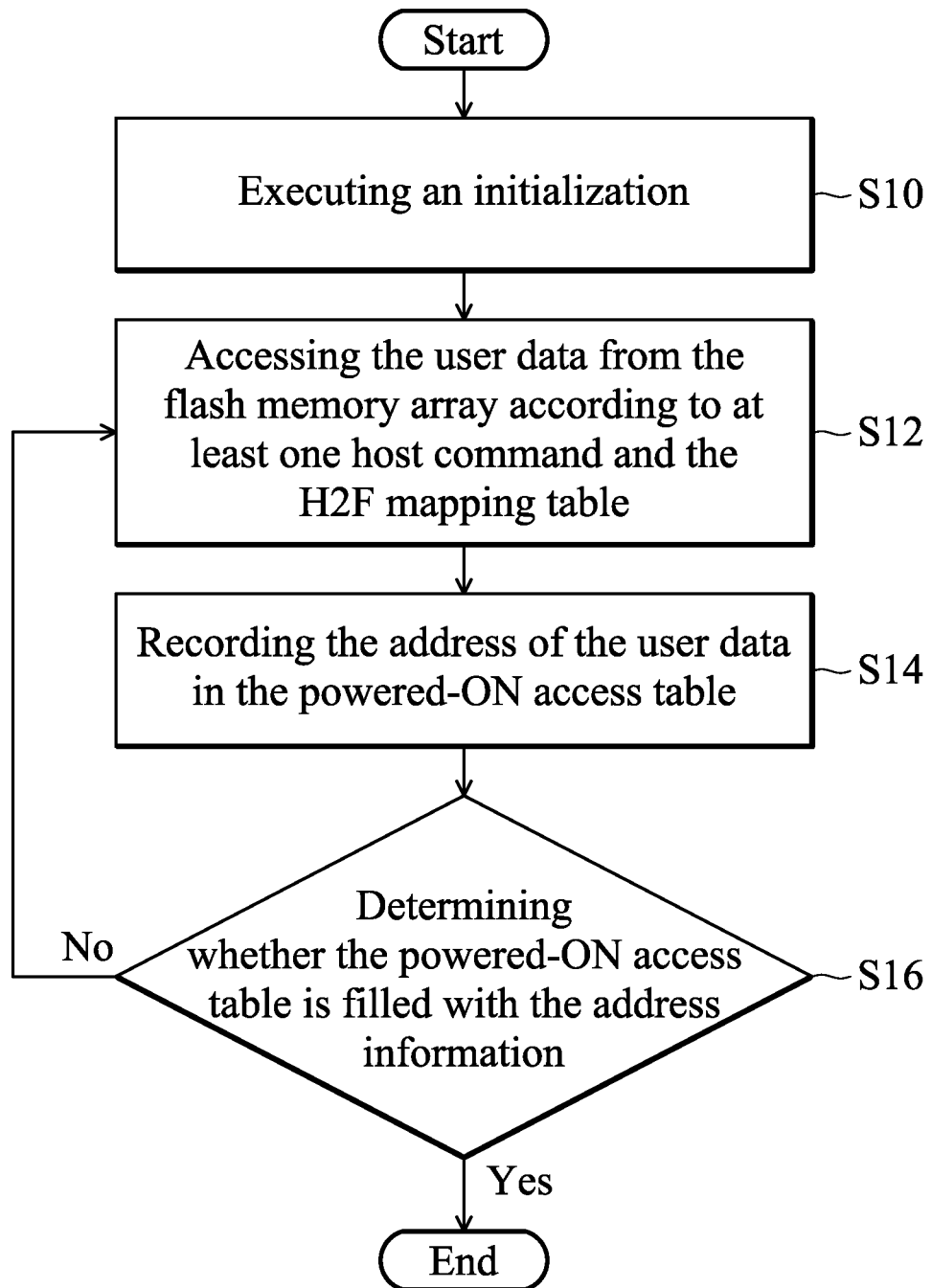
FIG. 3A is a flow chart of a method for building a powered-ON access table in accordance with an embodiment of the invention.

FIG. 3A is a flow chart of a method for building a powered-ON access table in accordance with an embodiment of the invention. The method for building a powered-ON access table is adapted in the storage device 100. First, the storage device 100 executes an initialization (Step S10), in which the initialization of the storage device 100 may be triggered by a re-supplied power or a command of the host 10.

The user data is accessed from the flash memory array 101 according to at least one host command and the H2F mapping table (Step S12). When the storage device 100 finishes the initialization, it waits to receive at least one host command from the host 10. It is assumed that the host 10 also finishes the initialization and begins prefetching the operation system, and the host command is mainly a data-reading command for requesting the storage device 100 to provide files of the operation system. The storage device 100 reads the user data (i.e., files of the operation system in the flash memory array 101 according to the host command(s) and the H2F mapping table, and provides the user data to the host 10. In addition to a data-reading command, the host command(s) may also be a data-writing command.

Then, the address of the user data is recorded in the powered-ON access table (Step S14), and whether the powered-ON access table is filled with the address information is determined (Step S16). When the powered-ON access table is not filled with the address information, the address information is continuously recorded; when the powered-ON access table is filled with the address information (for example, 8 MB address information has been stored already), the method for building the powered-ON access table provided in the invention is terminated.

Figure 3B:
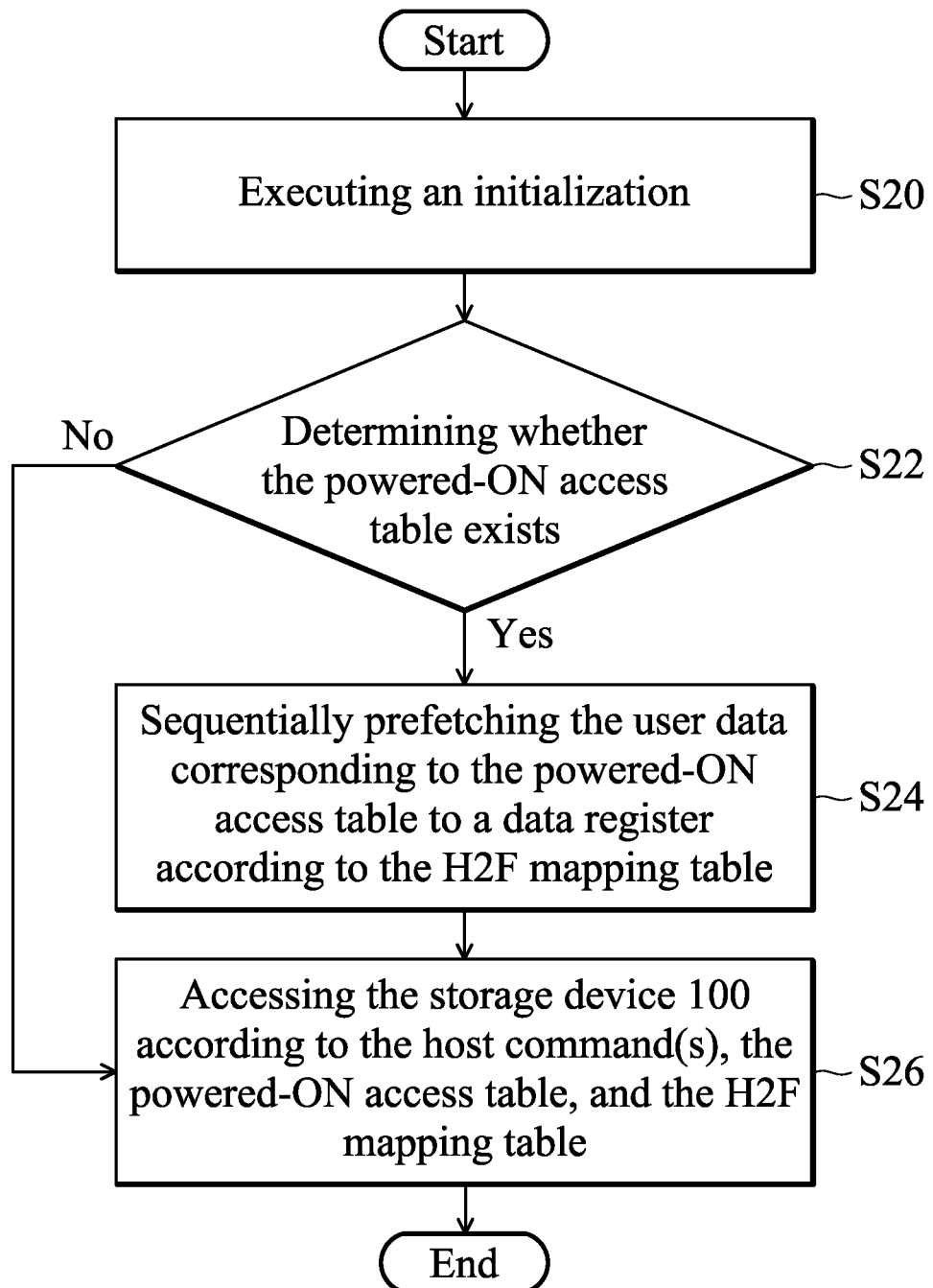
FIG. 3B is a schematic diagram of a method for utilizing a powered-ON access table in accordance with another embodiment of the invention.

FIG. 3B is a schematic diagram of a method for utilizing a powered-ON access table in accordance with another embodiment of the invention. The method for utilizing the powered-ON access table is adapted in the storage device 100.

The storage device 100 executes the initialization (Step S20), in which the initialization of the storage device 100 can be triggered by a re-supplied power or at least one host command of the host 10.

Then, whether a powered-ON access table exists is determined (Step S22). When the powered-ON access table exists, Step S24 is executed. Otherwise, the method for utilizing the powered-ON access table is terminated.

According to the H2F mapping table, the user data corresponding to the powered-ON access table is sequentially prefetched to a data register (Step S24), in which the data register may be the DRAM 102. When the size of the user data corresponding to the powered-ON access table exceeds the capacity of the data register, part of the user data corresponding to the powered-ON access table is first prefetched to the data register, and the rest of the user data corresponding to the powered-ON access table is then loaded up to the data register. According to an embodiment of the invention, the powered-ON access table is illustrated in FIG. 2B, such that the controller 103 may sequentially prefetch the user data corresponding to the powered-ON access table to the data register without the H2F mapping table.

The storage device 100 is accessed according to the host command(s), the powered-ON access table, and the H2F mapping table (Step S26). The storage device 100 receives the host command(s) from the host 10 and first determines whether the logic address in the host command(s) is recorded in the powered-ON access table. When the logic address in the host command(s) is recorded in the powered-ON access table, the storage device 100 directly provides the user data stored in the data register to the host 10. When the logic address in the host command(s) is not recorded in the powered-ON access table, the storage device 100 accesses the user data stored in the flash memory array 101 according to the host command(s) and the H2F mapping table.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A storage device, comprising: flash memory array, storing a plurality of user data; and
   a controller, wherein in a period after the controller finishes initialization and when the controller receives a host request, the controller accesses the user data in the flash memory array according to a plurality of host commands from the host and an H2F mapping table and records a plurality of address information about the user data in a powered-ON access table.

2. The storage device of claim 1, wherein the size of the powered-ON access table is less than the H2F mapping table.

3. The storage device of claim 1, wherein the address information is a plurality of logic addresses of the user data.

4. The storage device of claim 1, wherein the address information further comprises a plurality of physical addresses of the user data.

5. The storage device of claim 1, wherein the controller records, according to an access order of the user data, the address information in the powered-ON access table.

6. A storage device accessed by a host, comprising:
   a flash memory array, storing a plurality of user data; and
   a controller, wherein in a period after the controller finishes initialization and when the controller receives a host request, the controller determines whether a powered-ON access table exists in the flash memory array, wherein when the powered-ON access table exists in the flash memory array, the controller prefetches the user data corresponding to the powered-ON access table to a data register.

7. The storage device of claim 6, wherein the controller further prefetches the user data corresponding to the powered-ON access table to the data register according to an H2F mapping table.

8. The storage device of claim 6, wherein when the user data corresponding to the powered-ON access table exceeds capacity of the data register, the controller only prefetches a part of the user data corresponding to the powered-ON access table to the data register.

9. The storage device of claim 6, wherein the controller sequentially prefetches the user data corresponding to the powered-ON access table to the data register.

10. The storage device of claim 6, wherein after the controller finishes the initialization and before the controller receives a host command, the controller prefetches the user data corresponding to the powered-ON access table to the data register.

11. A method for utilizing a powered-ON access table of a storage device accessed by a host, comprising:
    executing an initialization; and
    determining whether the powered-ON access table exists in a period after the controller finishes initialization and when the controller receives a host request, wherein when the powered-ON access table exists, prefetching user data corresponding to the powered-ON access table from a flash memory array to a data register.

12. The method of claim 11, further comprising:
    accessing the storage device according to a plurality of host commands, the powered-ON access table, and an H2F mapping table.

13. The method of claim 11, further comprising:
    when the powered-ON access table does not exist, accessing the storage device according to a plurality of host commands and an H2F mapping table.

* * * * *